UNITED STATES PATENT OFFICE.

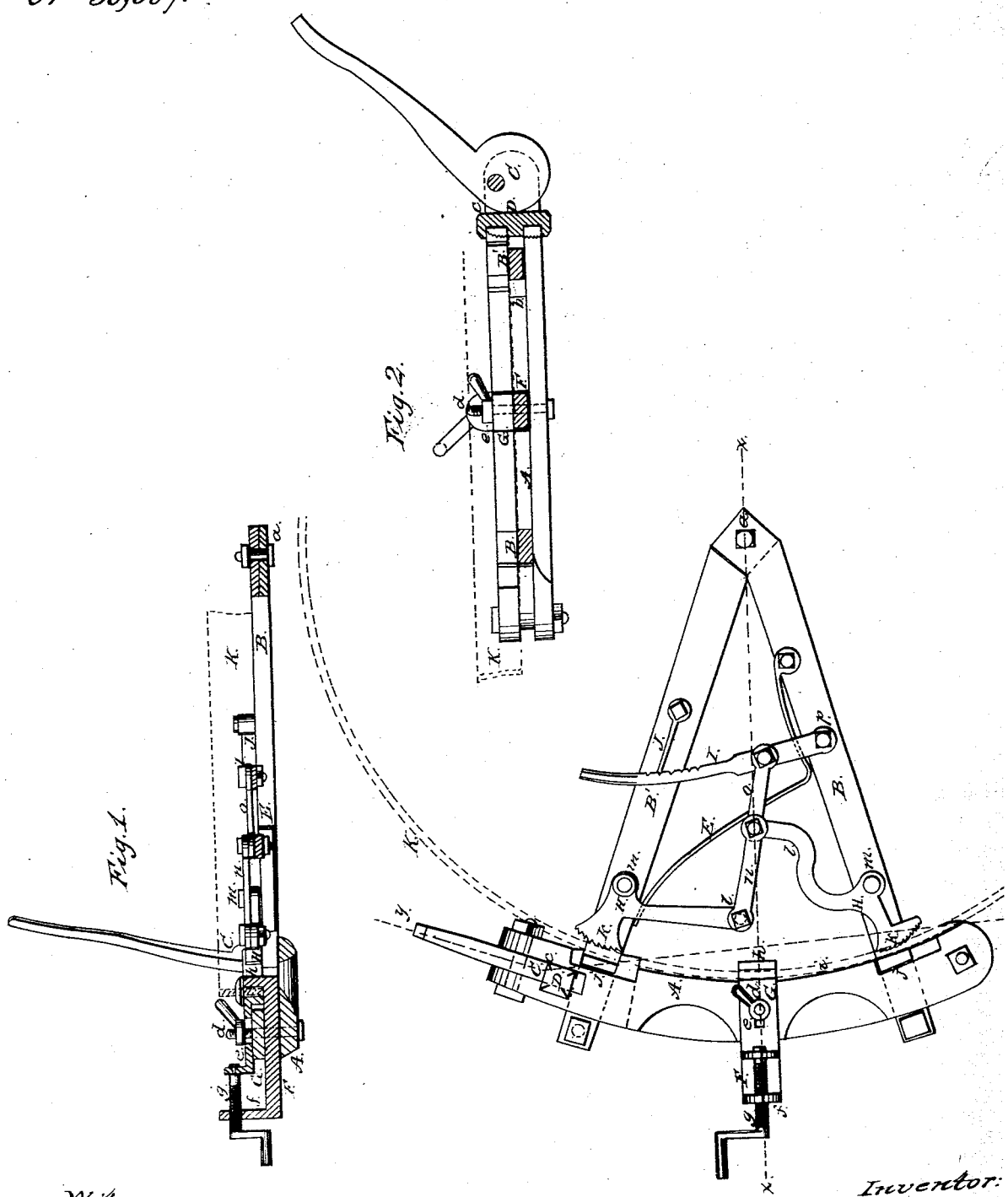

A. P. CASSELL, OF WATAGA, ILLINOIS.

SHRINKING TIRES.

Specification of Letters Patent No. 30,387, dated October 16, 1860.

*To all whom it may concern:*

Be it known that I, A. P. CASSELL, of Wataga, in the county of Knox and State of Illinois, have invented a new and Improved Device for Shrinking Tires; and I do hereby declare that the following is a full, clear, and exact description of the same, reference being had to the annexed drawings, making a part of this specification, in which—

Figure 1 is a vertical section of my invention taken in the line $x$, $x$, Fig. 3. Fig. 2, a vertical section of the same taken in the line $y$, $y$, Fig. 3. Fig. 3, a plan or top view of the same.

Similar letters of reference indicate corresponding parts in the several figures.

The object of this invention is to obtain a simple and portable device for upsetting or shrinking wheel tires so that the latter may be made to fit the wheels without cutting and rewelding after being once formed.

To enable those skilled in the art to fully understand and construct my invention I will proceed to describe it.

A, represents a curved metal bar in which the ends of two bars B, $B^1$, are fitted said bars being connected at their opposite ends by a joint $a$. The bar B, is fitted permanently in the bar A, near one end of it, but the bar $B^1$, is allowed a certain degree of play in the bar A, a slot $b$, being made in the latter for such purpose as shown clearly in Fig. 2.

C, is an eccentric which is fitted in a slot $c$, in the end of bar A, opposite the bar $B^1$, and in this slot between the eccentric and the bar $B^1$, there is placed a slide D, which is shown clearly in Figs. 2 and 3. Between the two bars B, $B^1$, there is placed a spring E, which has a tendency to keep the bar $B^1$, thrown out to its fullest extent from the bar B, see Fig. 3.

In the curved bar A, at about its center there is fitted transversely a bar F, said bar being fitted in a mortise or hole in bar A, and having an oblong slot made in it through which a screw bolt $d$, passes the latter having a thumb nut $e$, on one end. There is also fitted in the bar A, directly above bar F, a shorter bar G, which also has an oblong slot in it to allow the bolt $d$, to pass through. The outer end of bar F, is provided with a lip $f$, which is at right angles with the bar and through the lip $f$, a screw $g$, passes the inner end of which is fitted to the outer end of bar G. The inner end of bar F, is also provided with a lip $h$, which is parallel with lip $f$, and the inner end of bar G.

The inner side of the bar A, is provided with a shoulder $i$, and each bar B, $B^1$ has a lip $j$ on it said lips being at the inner side of the bar A.

To each bar B, $B^1$, there is attached a dog H. These dogs are formed of serrated segments $k$, at the ends of bent levers $l$, which have their fulcra at $m$. The inner ends of these levers $l$, are connected together by a link $n$, and are connected to a lever I, by a link $o$, the lever I, having its fulcrum at $p$, and being serrated at one side to receive a pawl J, which is attached to bar $B^1$, as shown clearly in Fig. 3.

The operation is as follows: The tire K, to be shrunk or upset is heated to a proper degree at the required spot and the tire is placed on the bars B, $B^1$, the heated portion being between them. The tire is placed between the lips $j$ of the bars B, $B^1$, and the serrated faces of the dogs H, and between the inner end of the bar G, and the inner lip $h$, of the bar F. The bars F, G, are adjustable and they form a central guide or bearing for the center of the tire between the bars B, $B^1$, and as both bars are rendered adjustable by the screws $g$, $d$, the bearing formed by said bars may be adjusted to suit the diameter of the tire and also its thickness. When the tire is properly adjusted in the device the dogs H, H, are made to clamp it by adjusting lever I, and the eccentric C, is turned so as to force bar $B^1$, toward bar B, and the heated portion of the tire between the dogs H, will be compressed, or upset and the diameter of the tire reduced to the required size.

The device is operated in a horizontal position and the lever I, is retained in proper place by the pawl J, so that the dogs H, will not be moved and their hold relaxed under the action of the bar $B^1$.

Having thus described my invention, what I claim as new and desire to secure by Letters Patent, is:

The arrangement of the adjustable bars F, G, and dogs H H with the curved bar A, jointed bars B $B^1$ slide D, spring E and eccentric C as and for the purposes herein shown and described.

A. CASSELL.

Witnesses:
GEORGE EKSTRAND,
JONAS WILLIAMS.